Feb. 7, 1939.    J. J. FASMER    2,146,061
CONVEYER
Filed May 9, 1936

INVENTOR
John J. Fasmer
BY J. Stanley Churchill
ATTORNEY

Patented Feb. 7, 1939

2,146,061

UNITED STATES PATENT OFFICE 2,146,061

CONVEYER

John J. Fasmer, Aurora, Ill., assignor to Redler Conveyor Company, Quincy, Mass., a corporation of Massachusetts Application May 9, 1936, Serial No. 78,875

5 Claims. (Cl. 198—212)

This invention relates to a feeding device for feeding flowable solid material.

The invention has for an object to provide a novel and improved feeding device for feeding flowable solid material which may be economically manufactured, is efficient in its operation, and lends itself to various industrial uses, as will be pointed out.

With this general object in view and such others as may hereinafter appear, the invention consists in the feeding device and in the various structures, arrangements and combinations of parts hereinafter described and particularly defined in the claims at the end of this specification.

Figure 1:
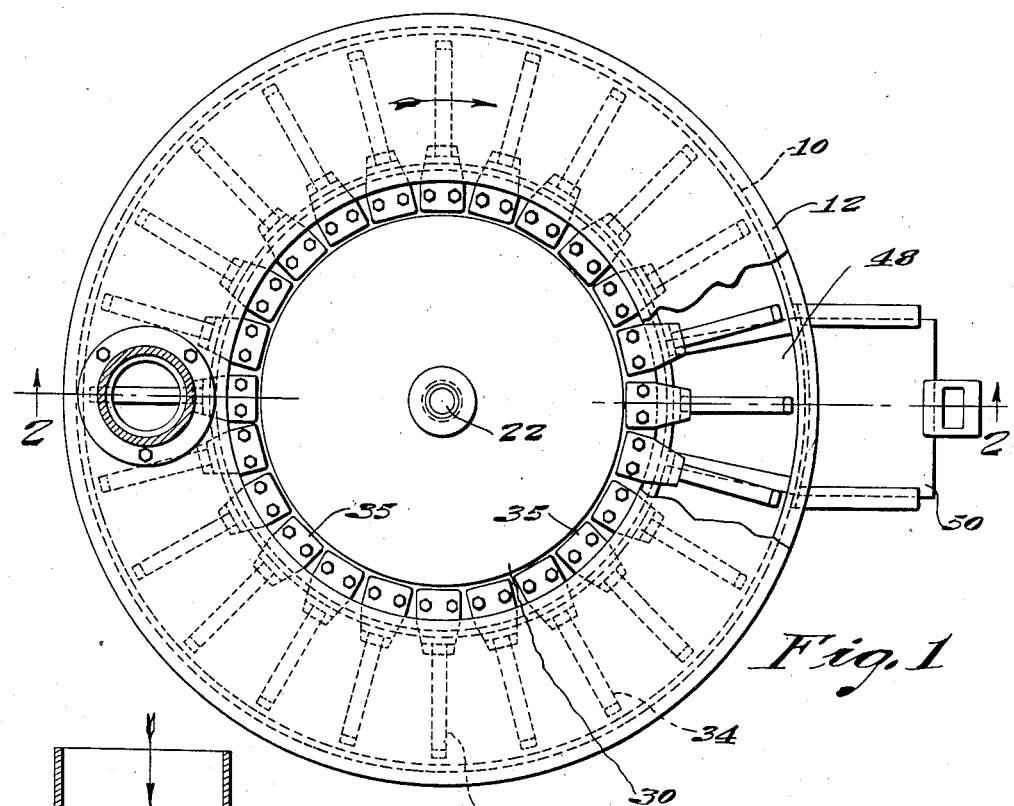
Figure 2:
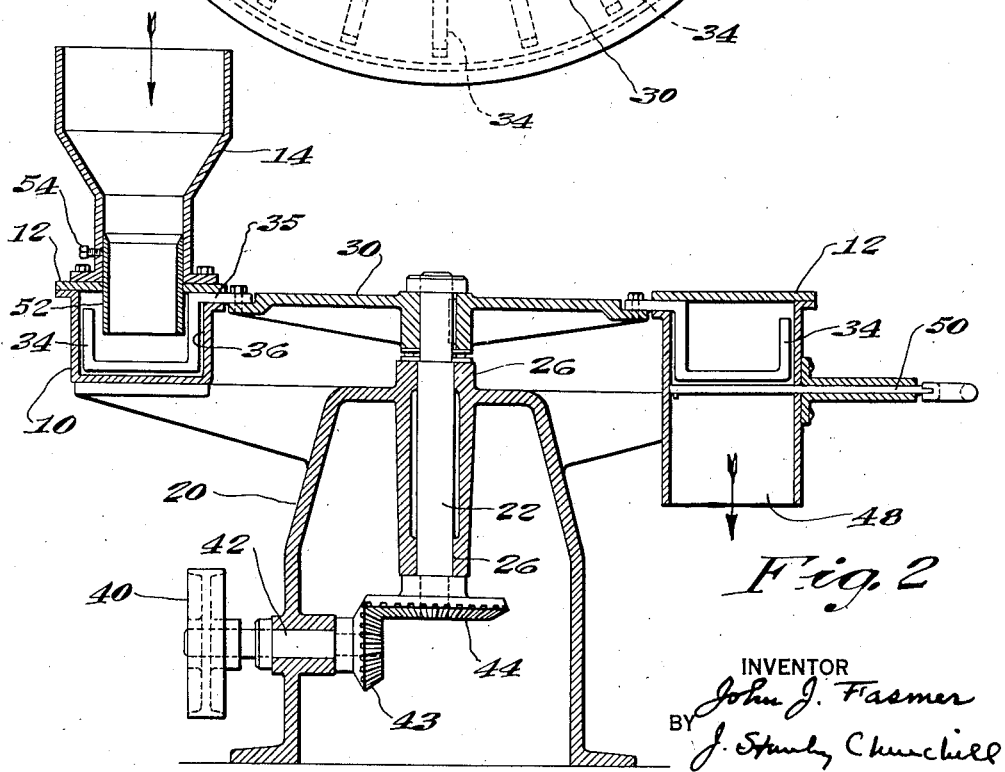

In the drawing illustrating the preferred embodiment of the invention, Fig. 1 is a plan of the present feeding device; and Fig. 2 is a vertical section on the line 2—2 of Fig. 1.

In general, the present feeding device finds particular use in feeding flowable solid material from a source of supply to a point in use in substantially close proximity to the point of supply, and in general comprises a circular casing or trough into which the material to be fed is delivered from a source of supply at one location and is arranged to be conveyed through the casing or trough conveying mechanism disposed therein and arranged to be moved therethrough and in a circular path. In its preferred form the invention contemplates conveying mechanism comprising a plurality of spaced conveyer flights of an open structure capable of conveying the material through the trough or casing in a continuous stream. The material is discharged from the trough at one or more points remote from the point of supply. In order to efficiently move the flights through the circular trough, provision is preferably made for rigidly connecting the flights in predetermined relation to one another and for effecting the movement thereof from a single rotary member.

Referring now to the drawing, which as above stated illustrates the preferred embodiment of the invention, 10 represents a circular trough or casing which may and preferably will be provided with a cover 12 for protecting the material during its movement through the casing. The cover member, as herein shown, has mounted upon it a supply conduit 14 through which material is supplied to the trough or casing through an inlet opening in the cover. The casing 10 may and preferably will be mounted upon a supporting base 20 within which a rotatable shaft 22 is operatively supported, being mounted in suitable bearings 26. The shaft 24 is provided upon its upper end with a disk 30 preferably keyed thereto to rotate therewith and a plurality of open flights 34 are attached to the periphery of the disk. The flights 34 may and preferably will comprise individual U-shaped bars shaped and mounted to sweep the bottom and side walls of the casing but without engaging the same, and are provided with flanged portions 35 adapted to be bolted to the disk 30, as shown. The cover member 12 for the casing is disposed above the inner wall 36 of the casing sufficiently to permit free passage of the flanges beneath the same during the rotation of the disk. Provision is made for rotating the disk from any convenient source of power, herein shown as comprising a driven pulley 40 on a counter-shaft 42 through bevel gears 43, 44 on the countershaft 42 and lower end of the vertical shaft 22 respectively. The material being conveyed may be discharged at any desired point or points in the circular trough through discharge openings only one of which is shown and indicated at 48. A suitable gate 50 of any usual or preferred constructions may be provided at each discharge opening for controlling the flow of the material therethrough. In operation the material is fed through an adjusting sleeve 52 which regulates the depth and quantity of the material carried around the trough. The sleeve 52 is vertically adjustable at the mouth of the hopper 14 and is retained in its adjusted position by a set screw 54.

From the description thus far, it will be observed that the present feeding device is simple in construction and positive in operation, and may be efficiently used in those commercial installations where it is desirable to feed material between points spaced reasonably near one another. An important advantage resulting from the skeleton or open structure of the conveyer member resides in its ability to convey the material through the trough in a continuous uniform stream. When the discharge outlet or outlets become closed or choked, the open or skeleton flights are capable of pulling through the material without materially disturbing the rotation thereof.

The present invention is particularly applicable to the feeding of material to weighing or other forms of packaging machines in that a constant and uniform flow from the discharge points may be effected and in that the rate of flow may be adjusted to suit the capacity of the weighers or other machines.

While the preferred embodiment of the invention has been herein illustrated and described, it will be understood that the invention may be embodied in other forms within the scope of the following claims.

Having thus described the invention what is claimed is:—

1. A feeding device of the character described comprising a rotatable member, a plurality of U-shaped flights mounted upon the rotatable member, and a circular trough having its sides connected to its bottom wall within which said flights are disposed to travel in a circular path and with relation to the trough during rotation of said member.

2. A feeding device of the character described comprising a circular trough having its sides connected to its bottom wall, a source of supply or flowable solid material located at one part of the circular trough, a discharge opening from the circular trough located at another part of the circular trough and spaced from said supply, a plurality of open skeleton flights spaced apart and connected together, said flights being disposed within said circular trough to convey the flowable solid material from the supply to the discharge openings therein, and means for rotating said connected flights through the trough and with relation thereto.

3. A feeding device of the character described comprising a rotatable member, a plurality of U-shaped flights mounted upon the rotatable member, a circular trough having its sides connected to its bottom wall within which said flights are disposed to travel in a circular path and with relation to the trough during rotation of said member, and means for adjustably regulating the depth of material in the trough.

4. A conveyer of the character described comprising a circular trough having its sides connected to its bottom wall, a disk arranged concentrically with relation to the circular trough, a plurality of flights disposed within the trough and connected to the disk at spaced intervals around the periphery thereof, means for rotating the disk with relation to the trough, said trough being provided with material inlet and outlet means, and means for adjustably regulating the depth of material in the trough.

5. A conveyer of the character described comprising a circular trough having its sides connected to its bottom wall, a disk arranged concentrically with relation to the circular trough, a plurality of open skeleton flights disposed within the trough and connected to the disk at spaced intervals around the periphery thereof, and means for rotating the disk with relation to the trough, said trough being provided with material inlet and outlet means.

JOHN J. FASMER.